(12) United States Patent
Lee

(10) Patent No.: US 6,252,847 B1
(45) Date of Patent: *Jun. 26, 2001

(54) CALCULATION OF QUOTIENT-BASED EXPLICIT RATE ALGORITHM FOR ABR TRAFFIC

(75) Inventor: Denny L. S. Lee, Kanata (CA)

(73) Assignee: Alcatel Canada Inc., Kanata (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/928,476

(22) Filed: Sep. 12, 1997

(51) Int. Cl.$^7$ ................................. H04J 1/16; H04J 3/14
(52) U.S. Cl. ............................................ 370/229; 370/232
(58) Field of Search .................................. 370/230, 231, 370/232, 234, 235, 368; 395/232, 233, 234, 235; 708/654, 495, 504

(56) References Cited

U.S. PATENT DOCUMENTS

| | | | | |
|---|---|---|---|---|
| 4,707,798 | * | 11/1987 | Nakano | 708/654 |
| 4,823,301 | * | 4/1989 | Knierim | 708/650 |
| 5,633,859 | * | 5/1997 | Jain et al. | 370/234 |
| 5,754,530 | * | 5/1998 | Awdeh et al. | 370/232 |
| 5,777,984 | * | 7/1998 | Gun et al. | 370/230 |
| 5,812,527 | * | 9/1998 | Kline et al. | 370/232 |
| 5,862,059 | * | 1/1999 | Matula et al. | 708/270 |

* cited by examiner

Primary Examiner—Ajit Patel
(74) Attorney, Agent, or Firm—Marks & Clerk

(57) ABSTRACT

A system and method for calculating a quotient based algorithm without using a division operation. The quotient based algorithm is used to provide explicit rate values to ABR cell traffic in an ATM network. A look up table is used to obtain reciprocal values required to process the algorithm.

10 Claims, 1 Drawing Sheet

CALCULATION OF QUOTIENT-BASED EXPLICIT RATE ALGORITHM FOR ABR TRAFFIC

FIELD OF THE INVENTION

This invention relates to ATM networks and more specifically to a system and method for calculating a quotient-based explicit rate algorithm for ABR traffic transported through an ATM network without employing a division operation.

BACKGROUND

Asynchronous transfer mode (ATM) is rapidly becoming the technology of choice for high speed broad-band communications. The fixed length data element or cell permits the transport of multimedia data including voice and video from a network source to a network destination. The ATM Forum has defined five categories of service for ATM cell traffic including both real time and non-real time connections. The five categories of service are: constant bit rate (CBR); real time variable bit rate (rtVBR); non-real time variable bit rate (nrtVBR); available bit rate (ABR); and unspecified bit rate (UBR). The quality of service (QoS) for each service category has also been specified in order to accommodate the different traffic requirements. Obviously real time traffic cannot tolerate significant time delays through the network. On the other hand, data traffic such as electronic-mail can tolerate time delays but must ensure minimal cell loss.

Available bit rate (ABR) service category is one of the most important mechanisms for carrying bandwidth on demand traffic such as today's local area network (LAN) traffic. ABR traffic is particularly significant in that it makes optimum use of network bandwidth by dynamically adjusting its transmission rate to use the bandwidth not involved in higher priority traffic. In order to make optimum use of the bandwidth and still ensure minimal cell loss the ABR service category employs a feedback loop which monitors network congestion and returns congestion information to the data source. The congestion information is carried in resource management (RM) cells within the cell header. The resource management cells receive congestion information at each node as the ABR traffic progresses from the source to the destination. At the destination the resource management cell is returned to the source, again passing through each node where updated congestion information may be inserted. The congestion information may indicate that the source traffic should continue at its present rate or that it should be reduced in view of severe congestion. A third type of information that may be carried by the resource management cell is explicit rate (ER) information. Explicit rate information is an indication of the ABR traffic which may be transmitted from the source without increasing congestion to the point where cells may be dropped.

Explicit rate information is based on the instantaneous bandwidth available to ABR traffic, i.e. bandwidth not committed to CBR and VBR traffic, and the number of connections or contention points requiring bandwidth. It is understood that explicit rate marking provides a better network utilization performance by forcing the ABR source to transmit at a desirable rate during network congestion conditions. Not only does ER marking encourage faster rate convergence under congestion, but it provides better fairness to ABR connections competing for the same network resources, both bandwidth and buffer usage.

Many explicit rate algorithms have been identified and most of these have a common characteristic in that division is involved. The division arithmetic is employed in these algorithms to distribute bandwidth fairly amongst the competing ABR connections. To realize such an operation poses a serious challenge especially at today's ATM interface speed which operates at hundreds of megabits per second. Division is viewed as an infrequent operation by the computing design community because of the significantly greater number of processing steps than are required for addition, subtraction and multiplication. The larger number of processing steps result in greater time delays and/or system complexity.

To handle ABR flow control at an ATM interface, the ER algorithm must operate in real time to sustain the required throughput. Regrettably, it does not enjoy the luxury of using a low-latency divider as in the environment of a general purpose computer. The present invention addresses this dilemma by bypassing the division operation in quotient-based explicit rate algorithms thus achieving a high throughput without incurring the high cost and design complexity of a high speed floating point divider.

SUMMARY OF THE INVENTION

It is an object of the present invention to provide a system and a method for calculating a quotient-based explicit rate algorithm without employing a division operation.

It is a further object of the present invention to calculate the quotient-based algorithm by using a look-up table to obtain the value of the denominator.

Therefore, in accordance with a first aspect of the present invention there is provided a system for dynamically processing a quotient-based algorithm without utilizing a division operation comprising: measurement means for determining instantaneous values for the numerator and denominator of the quotient-based algorithm; a look-up table having stored values of the denominator; and multiplication means to access the look-up table for the value of the denominator and for multiplying the numerator and the value of the denominator obtained from the look-up table.

In accordance with a second aspect of the present invention there is provided a system for processing an explicit rate quotient-based algorithm for determining available bandwidth for ABR traffic at a contending connection in an ATM network transporting multi-service category ATM traffic from a source to a destination. The system comprises: calculating means for obtaining, at the contending connection, data respecting instantaneous bandwidth available for ABR cells through the network and the aggregate ABR bandwidth requirements; a look-up table for providing reciprocal values for the aggregate bandwidth requirements; and processing means to calculate the explicit rate by finding the product of the available bandwidth and the reciprocal value from the look-up table.

In accordance with a third aspect of the present invention there is provided a method of processing a quotient-based algorithm without utilizing a division operation comprising the steps of: determining the instantaneous value of the numerator and the denominator of the algorithm; obtaining a value for the denominator from a look-up table; and multiplying the numerator and the value of the denominator obtained from the look-up table to solve the algorithm.

BRIEF DESCRIPTION OF THE DRAWINGS

The invention will now be described in greater detail with reference to the attached drawings wherein.

DETAILED DESCRIPTION OF THE INVENTION

The following captures a methodology to adopt a quotient-based ER algorithm into a computationally efficient form without using any division operation. The whole exercise operates under the assumption that the ER calculation must be performed efficiently to ensure a high throughput at an ATM interface. The following are several operating assumptions and observations:

a) It is to be understood that arithmetic based on the ATM Forum Floating-Point (FP) format can attain a latency as low as 2 clocks per operation. The floating point arithmetic unit can support multiplication, addition and subtraction and these operations are denoted as afp_mul, afp_add and afp_sub respectively. Division is not supported and the objective of this invention is to perform the quotient operation without using a divider.

b) For performance sake, one wants to avoid the classical integer multiplication and division since they can take up to 34 clocks to execute. This exercise therefore attempts to use afp_mul/add/sub as much as possible to maximize performance.

c) Due to the lack of negative exponent, the ATM Forum floating point cannot represent numbers between 0 and 1: R cell per sec=$2^e*(1+m/512)$ where e is the exponent (bit 13:9)
where m is the mantissa (bit 8:0)

Note that the ATM Forum FP also has a deficient property of not being able to represent floating point numbers above 512(i.e.: any number above 512 must be an integer).

Figure 1:
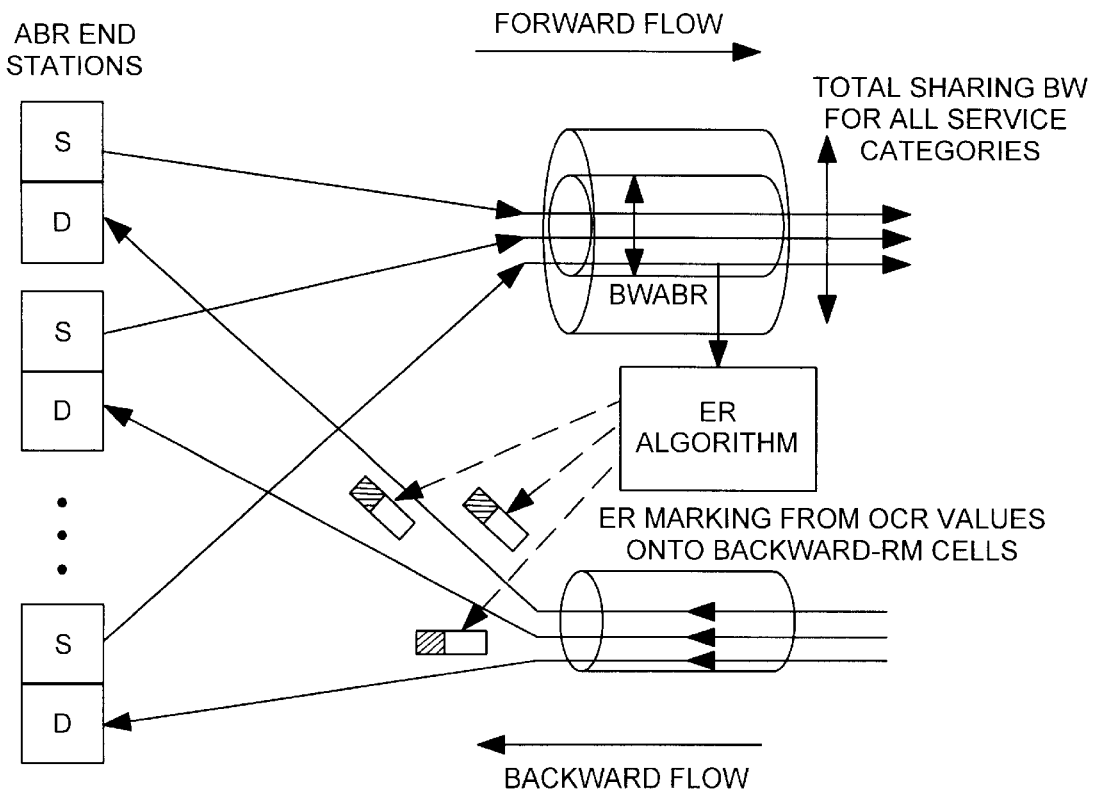
FIG. 1 illustrates the operating environment of the explicit rate algorithm.

A quotient-based algorithm is used herein as the basis of this exercise. It is believed that this form of the algorithm would still achieve max-min fairness in steady state due to overbooking when the system is in under load condition. The conceptual operating environment of such algorithm is depicted in FIG. 1.

OBW (Offered Band Width) takes on a non-classical meaning as it represents simply a feedback variable which could range from 0 to a large value. Note that it is likely that OBW will operate as a fractional number between 0 and 1 during run time. OBW can be initialized to some specially chosen value so that it can quickly attain max-min fairness condition during startup. Or one might also initialize it to any non-zero value and let it attain steady state naturally.

The explicit rate or offered cell rate for a node or connection (i) (OCRi) is obtained by solving the following equations:

$$OBW(k) = \frac{LCR - ARcac(k)}{ARabr(k)} \cdot OBW(k-1)$$

$$OCR_i = MCRi \cdot (1 + OBW(k))$$

where
LCR=line rate in unit of cell per sec (for example OC3: 149.76 Mbps/424 bpc=353207.55 cps).
ARcac(k)=measured aggregate BW (in cps) for CBR/rt/nrt-VBR connections at discrete time k.
ARabr(k)=measured aggregate BW (in cps) for ABR connections at discrete time k.
OBW(k)=unit-less variable in the feedback control loop for distributing available bandwidth amongst all ABR connections.
MCRi=minimum cell rate for connection i in unit of cps.
OCRi=offered cell rate or "internal local ER value" for connection i in unit of cps. It is this variable that is eventually compared with the ER value embedded in the backward RM cells. The OCRi value is placed onto the RM cell if it is the smaller value.

In order to implement the above equations efficiently in ATM Forum FP format given its limitations, it is necessary to transform these equations to an ATM Forum FP instructions-friendly format. Remember that the operating assumption is to use these instructions if possible to maximize performance. Initially, we will assume all the above rate variables are in ATM Forum FP format. Next, we need to perform a few exchanges of variables:

$$BWabr(k) = LCR - ARcac(k)$$

in ATM Forum FP cell per sec $$Modified\_OBW = MOBW(k) = 1 + OBW(k)$$

in ATM Forum FP format (no unit)

The algorithm becomes:

$$OBW(k) = \frac{BWabr(k)}{ARabr(k)} \cdot (MOBW(k-1) - 1)$$

$$MOBW(k) - 1 = \frac{BWabr(k)}{ARabr(k)} \cdot (MOBW(k-1) - 1)$$

$$MOBW(k) = 1 + \frac{BWabr(k)}{ARabr(k)} \cdot (MOBW(k-1) - 1)$$

$$= 1 + [BWabr(k)MOBW(k-1) - BWabr(k)]ARabr(k)^{-1}$$

$$OCRi = MCRi \cdot (MOBW(k))$$

The reason for converting to MOBW from OBW is because OBW can take on fractional values and is not ATM Forum FP friendly. With MOBW, it is possible to operate on it with the rate FP unit. In this format, the MOBW takes on the following range:

$$MOBW(k) \in \left[1.0, 2^{31} * \left(1 + \frac{511}{512}\right)\right]$$

The crux of this methodology is the use of Look Up Table (LUT) to arrive at the reciprocal value of an ABR aggregate bandwidth, $ARabr^1$. As such, one can perform the algorithm in a real time intensive environment such as an ATM interface. First, one must closely examine the nature of the ATM Forum floating point format. It has several special properties:

1) The floating point resolution increases exponentially as the number it represents decreases.
2) Within a particular binary exponent range, the resolution is constant.
3) Due to the 9 bit mantissa, it cannot represent any fractional number above 512.

The range of number representation is sampled in the following table:

TABLE 1

Resolution of ATM Forum floating point format

| No. Range | 2K–1K | 1K–512 | 512–256 | 256–128 | 128–64 | 64–32 | 32–16 | 16–8 | 8–4 | 4–2 | 2–1 |
|---|---|---|---|---|---|---|---|---|---|---|---|
| Resolution | 2 | 1 | .5 | .25 | .125 | .0625 | .03125 | .015625 | .0078125 | .039025 | .001953125 |
| No. of entries in each range | 512 | 512 | 512 | 512 | 512 | 512 | 512 | 512 | 512 | 512 | 512 |

Under the operating assumption that one would want to maximize the processing performance, the output of the LUT is preferably in ATM Forum FP format so that one can readily operate on it with the rate FP unit. As well, one wants the table size to be reasonably small so that it can be ideally located internally within the computing device. For the purpose of illustration, the following discussion assumes a LUT size of 1K entries.

Notice that with this FP format, there are only 9×512 entries that can represent a number with a fractional component. A reciprocal operation is a non linear function ($x \rightarrow 1/x$). As a result, representations for high rate reciprocal values suffer from the lack of resolution due to this non-linear effect. The following proposed look up table "magnifies" the reciprocal according to the binary exponential range. This magnification factor introduces a linear operation which has to be undone eventually in the final equation.

The following depicts the mapping transfer function in the new LUT. The sample size of the LUT is 1K-by-(16+5=21) bit. The LUT transformation is:

$$B \xrightarrow[LUT]{} 2^n \cdot \left(\frac{1}{B}\right) = 2^e\left(1 + \frac{m}{512}\right)$$

where
  n=magnification factor
  e=exponent in ATM Forum FP format
  m=mantissa in ATM Forum FP format Effectively, the magnification factor is simply a negative exponent representation. If "n" remains as a constant throughout the table, the representation resembles that of the IEEE floating point format. The novelty here is that "n" is chosen in conjunction with "e" and "m" so as to minimize on quantization error. The problem is reduced to an optimization process expressed as in equation (A):

$$2^n \cdot \left(\frac{1}{B}\right) = 2^e \cdot \left(1 + \frac{m}{512}\right) \quad (A)$$

$$\frac{1}{B} = 2^{e-n-9} \cdot (512 + m)$$

$$B \cdot (512 + m) \underset{opt}{=} 2^{9+n-e}$$

For the purpose of further arithmetic operation on the resultant LUT value, the range of these integer parameters "n", "m" and "e" are artificially capped with the following range (if the optimization results in values that are close to the top end of ATM Forum FP range, further arithmetic, such as afp_mul operation, might cause overflow):
m=[0.511]
e=[0.14]
n=[0.14]
A simple computer program can be generated to perform the optimization in equation (A). For each input value of B, a set of {m, e, n} is identified given the above range of constraints. The results of this optimization process are the contents of the LUT. For all values of B in the range of interest (0 to 1024-1), the LUT will look up
1) "n" the magnification factor,
2) an ATM Forum FP number which contains an exponent "e" and a mantissa "m".

Figure 2:
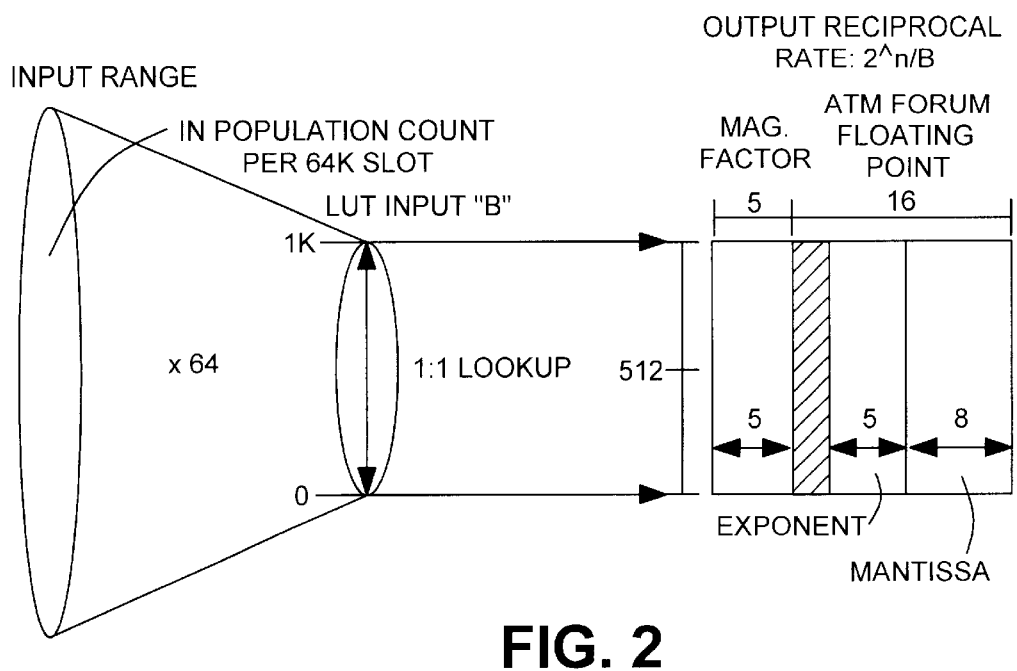
FIG. 2 illustrates the reciprocal look-up process.

The LUT process is depicted in FIG. 2. Note that the input rate, B, is expressed in a normalized number between 0 and 1K-1. There are many methods for measuring input rate of an input cell stream. For instance, the input rate can be measured by observing occupancy within a moving window. The population count of a particular connection within this window is effectively its instantaneous rate. For instance, FIG. 2 illustrates the use of a 64K sized moving window which is quantized into groups of 64 samples resulting in 1K indexes for the LUT. The binary exponent, n, in the above transformation denotes the magnification factor. This factor, n, needs to be eliminated (undo) later in the processing of the ER calculation to get at the actual reciprocal.

The effect of quantization and the discontinuity in the binary exponent range would cause deviation of the results from the ideal value.

During transient when non-ABR is bursting, the bandwidth available (BWabr) to ABR can temporarily be a negative number (when the input rate is allowed to burst in at a rate higher than the interface line rate.) For all intents and purposes, BWabr should, in such case, be floored at the smallest finite non-zero value. As such, one also ensures that OBW can never attain a negative value. Note that BWabr cannot go to zero since this will cause the resultant OBW to be stuck at zero indefinitely.

$$BWabr(k)=max(1, LCR-Pcac(k))$$

in count of cell per moving window size $$ARabr(k)=Pabr(k)$$

in count of cell per moving window size
where
  LCR in count of cell per moving window size
  Pcac(k) denotes cac traffic population count at time k
  Pabr(k) denotes abr traffic population count at time k
The algorithm becomes:

$$MOBW(k)=1+[BWabr(k)(MOBW(k-1)-BWabr(k)](Pabr(k)^{-1}$$

$$OCRi=MCRi \cdot (MOBW(k))$$

Simply use the following substitution in the algorithm:

$$A=[BWabr(k) \cdot MOBW(k-1)-BWabr(k)]$$

$$B^{-1}=Pabr(k)^{-1}$$

$$2^n(B^1)=LUT(Pabr(k))$$

Note that due to the ATM Forum FP limitation, the term A could still be a fractional value (i.e. between 0 and 1). That is we want to ensure this inequality holds at all times:

A>1

$$BWabr(MOBW-1) > 1$$

To ensure that, we would amplify this term by 2^9 and undo the amplification later.

$$A'' A \cdot 2^9$$

$$= 2^9 \cdot [BWabr(k) \cdot MOBW(k-1) - BWabr(k)]$$

Now, invoke the following simple arithmetic to rectify the additional magnification factor from the output of the LUT. The Modified_OBW (MOBW) takes on this new form which can be easily calculated with an ATM Forum formatted rate arithmetic unit:

$$MOBW(k) = 1 + A \cdot \frac{2^n(B-1)}{2^n}$$

$$= 1 + A \cdot \frac{LUT(Pabr(k))}{2^n}$$

$$= 1 + A' \left( \frac{LUT(Pabr(k))}{2^{n+9}} \right)$$

$$= \frac{2^{(n+9)} + A' \cdot LUT(Pabr(k))}{2^{n+9}}$$

and the offered cell rate simply remains as:

$$OCRi = MCRi \cdot MOBW(k).$$

The following is a sample pseudo code with utilizes the above methodology. It assumes a reciprocal LUT size of 1K entries which requires a 10 bit input index. Note that "add" and "sub" are unsigned integer arithmetic of addition and subtraction respectively. These can typically be done in 1 clock cycle. The term "Int2Rate" is an operation that converts an integer value to ATM Forum FP format. This can be done in 2 clocks periods.

```
Constant:
LCR = some constant line interface rate;   /*convert OC3 line rate to
                                             count per 64K window*/
one = Int2Rate(1);                         /*convert value 1 to ATM FP
                                             format*/
fivetwelve = Int2Rate(512);                /*convert value 512 to
                                             ATM FP format*/
On cell arrival:
Update Pcac;         /*collect cell rate in population count*/
Update Pabr;         /*collect cell rate in population count*/
On period timer for calculating OBW:
Pcac = (Pcac>>6);    /*normalize to a 10 bit index*/
Pabr = (Pabr>>6);    /*normalize to a 10 bit index*/
/*calculate available BW for ABR*/
/*floor the value to at least integer 1*/
BWabr = Int2Rate(max(sub(LCR, Pcac), 1));
BWabr = afp_mul(BWabr, fivetwelve);
/*calculate term A*/
Temp_A = afp_sub(afp_mul(BWabr, MOBW), BWabr);
/*look-up pseudo-reciprocal*/
Pseudo_Reciprocal = LUT(Pabr) & 0x0000FFFF;
/*look-up magnification factor*/
/*shift right to align with "e"*/
Mag_Factor = [LUT(Pabr) & 0xFFFF0000]>>7;
/*undo the magnification effect in the look-up table,
     can use an unsign subtraction here to save a clock*/
MOBW = sub(afp_mul(Temp_A,Pseudo_Reciprocal),
     add(Mag_Factor,9<<9);
/*calculate final MOBW*/
MOBW = afp_add(MOBW, 1);
On RM cell arrival on connection i:
OCR(i) = afp_mul(MCR(i), MOBW)       /*update OCRi on RM cell*/
```

The above Quotient-based ER algorithm requires approximately 6 rate instructions, 8 regular integer instructions and 1 internal table look up. If each rate instruction in an ATM Forum Floating Point arithmetic unit takes 2 clocks to execute, the whole OBW calculation should take less than 30 clocks. On the contrary, a single division operation can take up to 34 to 61 clocks. OCR calculation is also trivialized to only a single rate instruction at RM cell arrival time. The use of the above methodology for a quotient-based algorithm allows one to attain high speed operation as required at an ATM interface.

While a preferred embodiment of the invention has been described and illustrated it will be apparent to one skilled in the art that various alternatives and alterations can be introduced without departing from the basic concept. It is to be understood that such alternatives and alterations will fall within the scope of the invention as defined by the appended claims.

What is claimed is:

1. A method of obtaining an explicit rate (ER) traffic value for insertion into a resource management (RM) cell of Available Bit Rate (ABR) category of service cell traffic at a switching node in an Asynchronous Transfer Mode (ATM) communications system wherein said ER value is used to dynamically control transmission rates of ABR traffic through said system, said method comprising:

providing an arithmetic rate unit at said switching node to dynamically measure bandwidth available for use by ABR traffic and bandwidth requirements for all contending connections;

converting said measured bandwidth values into a floating point format of the form: $2 \wedge e \ast (1+m/512)$ where e is a 5 bit exponent and m is a 9 bit mantissa;

accessing a look up table in a computing device to obtain a reciprocal value in floating point format of said measured bandwidth requirements for all contending connections; and multiplying said measured values of available bandwidth and bandwidth requirements in said arithmetic rate unit to obtain said ER value for said connections.

2. The method of claim 1 wherein a value of one is added to said reciprocal value in said look up table to accommodate fractional values in floating point format.

3. The method of claim 2 wherein a magnification component is used in said look up value to accommodate a non-linearity in conversion to floating point format.

4. A method as defined in claim 1 wherein said explicit rate value represents available bandwidth for use by a specific ABR connection as a function of total bandwidth available for use by all ABR connections.

5. The method of claim 1 wherein an integer is added to said reciprocal in floating point format.

6. The method of claim 5 wherein said integer is one.

7. The method according to claim 1 wherein a magnification factor is applied to said floating point format.

8. A method of obtaining a traffic rate value for one of multiple connections contending for bandwidth at a switching node in a communications system, said method comprising:

measuring dynamically, bandwidth available for use by said one connection and bandwidth requirements for the contending connections;

providing said measured bandwidth values into a floating point format of the form: $2\wedge e*(1+m/512)$ where e is a 5 bit exponent and m is a 9 bit mantissa;

accessing a look up table to obtain a reciprocal value in floating point format of said measured bandwidth requirements for all contending connections; and multiplying said measured values of available bandwidth and the reciprocal value to obtain said traffic rate value.

9. The method of claim 8 wherein a value of one is added to said reciprocal value in said look up table to accommodate fractional values in floating point format.

10. The method of claim 9 wherein a magnification component is used in said look up value to accommodate a non-linearity in conversion to floating point format.

* * * * *